United States Patent [19]

Brink

[11] Patent Number: 4,619,728
[45] Date of Patent: Oct. 28, 1986

[54] LAMINATING APPARATUS

[75] Inventor: Fredericus J. Brink, Veenendaal, Netherlands

[73] Assignee: Ingenieursbureau Het Noorden B.V., Veenendaal, Netherlands

[21] Appl. No.: 647,571

[22] Filed: Sep. 6, 1984

[30] Foreign Application Priority Data

Sep. 7, 1983 [NL] Netherlands ............................ 8303102

[51] Int. Cl.$^4$ ........................... B30B 3/04; B30B 15/34
[52] U.S. Cl. ................................. 156/555; 100/93 RP; 100/176; 156/583.1
[58] Field of Search ...................... 156/555, 582, 583.1, 156/583.5; 100/93 RP, 176

[56] References Cited

U.S. PATENT DOCUMENTS

| | | | |
|---|---|---|---|
| 2,967,562 | 1/1961 | Orchard | 156/555 |
| 3,840,420 | 10/1974 | Sarcia | 100/93 RP |
| 4,336,096 | 6/1982 | Dedekind | 156/555 |
| 4,383,882 | 5/1983 | Held | 156/555 |

FOREIGN PATENT DOCUMENTS 1404496 11/1959 Fed. Rep. of Germany .
1418739 10/1965 France .
2094711 9/1982 United Kingdom .

Primary Examiner—Michael Wityshyn
Attorney, Agent, or Firm—Blum Kaplan Friedman Silberman & Beran

[57] ABSTRACT

Apparatus for laminating articles such as cards, ID-cards and the like, with the aid of films, consisting of plastic foil that can be activated by heat, comprising two heated pressing rollers that can be driven, which are included in frames that are composed of side plates and through which the films and the article to be laminated that is placed therebetween are passed, wherein the frame, composed of side plates, for the one pressing roller is arranged fixedly whereas the other frame, composed of side plates, for the other pressing roller can rotate about a pivot located at a distance from the pressing roller. Furthermore the apparatus is provided with a device for lifting the films from the pressing rollers, whereas the pressing rollers are heated interiorly and exteriorly, or only exteriorly.

11 Claims, 3 Drawing Figures

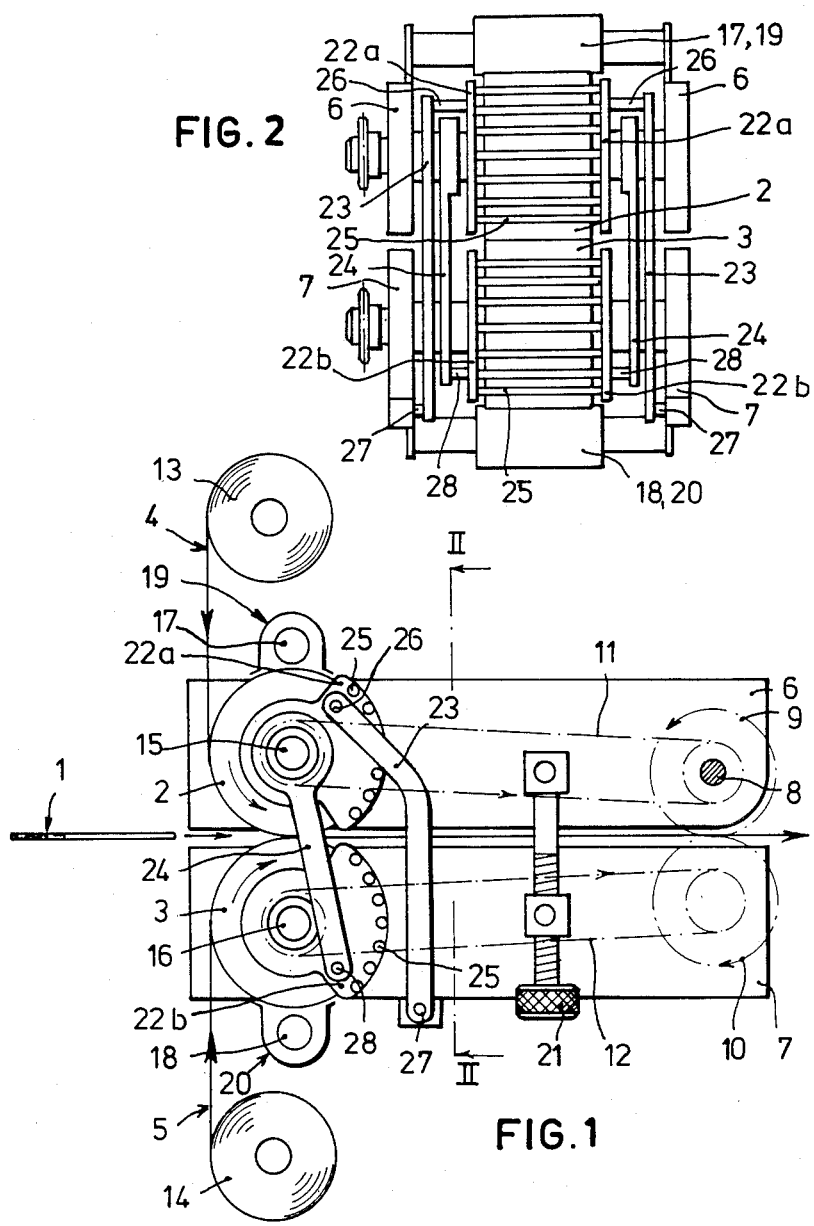

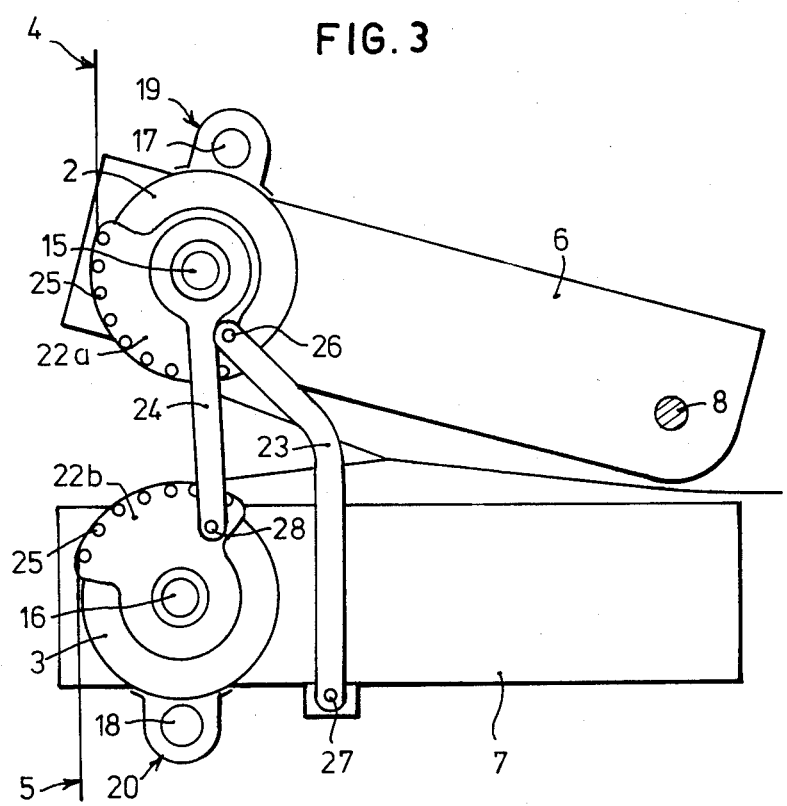

LAMINATING APPARATUS

The present invention relates to an apparatus for laminating articles such as cards, ID-cards and the like with the aid of films, consisting of plastic foil that can be activated by heat, comprising two heated pressing rollers that can be driven, which are included in frames that are composed of side plates and through which the films and the article to be laminated that is placed therebetween, are passed.

In such a laminating apparatus the contact surface of the pressing rollers consists of a rubber coating and when the pressing rollers are stationary the rubber coating could be burnt at the location of the external heating element, such as for instance an infra-red radiator.

In order to prevent the rubber coating from being burnt as indicated above when the laminating apparatus is stationary or during the pre-heating of the pressing rollers, an apparatus is presented which lifts the films from the pressing rollers, so that the pressing rollers can continue to rotate without a film transport taking place.

In order to attain this object a laminating apparatus is presented according to the invention, which is characterized in that the frame for the one pressing roller, composed of side plates, is fixedly arranged, whereas the other frame for the other pressing roller, composed of side plates, is rotatable about a pivot located at a distance from the pressing roller, in that a device is provided to lift the films from the pressing rollers, and in that the pressing rollers are heated interiorly and exteriorly, or only exteriorly.

The invention will be elucidated further hereinafter on the basis of the description and enclosed drawing in which:

FIG. 1 is a side view of the present apparatus;

FIG. 2 is a cross-section according to the line II—II in FIG. 1;

FIG. 3 illustrates the position of the pressing rollers with respect to each other, when the device to lift the films from the pressing rollers has been activated.

As illustrated in FIGS. 1 and 2, the present laminating apparatus comprises two pressing rollers 2 and 3, which are supported in a freely rotating manner in frames which are composed of side plates 6, 7 resp., the frame, composed of side plates 7, for the pressing rollers 3 being arranged fixedly.

The compression rollers 2, 3 resp. are driven from a central driving shaft 8, which also serves as a pivot for the frame of the pressing rollers 2, via a gear wheel 9, a gear wheel 10 respectively, which engages the gear wheel 9, and a chain 11, 12 respectively. The frame of the pressing roller 2 can be rotated about the pivot 8 via a screw spindle 21, so that the situation as illustrated in FIG. 3 is reached.

The films 4 and 5, with which an article 1 has to be laminated, and which are provided with a so-called "hot-melt", are fed from the store rollers 13, 14 resp., to the nip of the pressing rollers 2 and 3. The surface of the pressing rollers consists of a heat resistant rubber coating. The heating system of the pressing rollers 2 and 3 consists of an internal heating formed by the cartridge elements 15, 16 resp. The pressing rollers are exteriorly heated with the aid of an infra-red radiator 17, 18 resp., comprising a reflector 19, 20 resp. It is also possible to heat the pressing rollers only exteriorly. However, a heating system consisting of an internal and external heating is preferred, as because of the internal heating the necessary heat penetrates the rubber contact surface in a sufficiently deep way, while the external rubber surface of the pressing rollers is heated sufficiently by the infra-red radiators.

However, when the pressing rollers are stationary, for instance during heating or during the time the laminating apparatus is temporarily put out of operation, the rubber contact surface of the pressing rollers opposite to the external heating will quickly burn as a consequence of the heat irradiation. In order to prevent this a device is presented to lift the films 4, 5 from the pressing rollers 2, 3 so that during the time the pressing rollers are heated they can rotate without the films being carried along, and without local burning of the rubber contact surface of the pressing rollers as a consequence of the external heat irradiation. For this purpose circle segment-shaped elements 22a, 22b respectively are supported in a freely rotating manner on the projecting shaft ends of the pressing rollers 2, 3 resp., at both sides thereof, wherein the elements 22a, 22b, belonging to a compression roller 2, 3 respectively, are interconnected by means of freely rotating bars 25 that are located concentrically. When the laminating apparatus is in operation, the bars 25 of the circle segment-shaped elements 22a, 22b are located opposite to the respective circle segments of the pressing rollers 2, 3 which circle segments are most remote from the respective arriving film webs and are defined by the respective infra-red radiators 17, 18, and the nip of the pressing rollers 2, 3. The radius of the pitch circle that extends through the axes of the bars 25 plus half the diameter of the bar is somewhat larger than the radius of the pressing rollers. A first pair of coupling rods 23 is provided for the control of the circle segment-shaped elements 22a, and of said rods the one end is coupled with the circle segment-shaped element 22a via a pin 26, whereas the other end is coupled with the side plate 7 via a pin 27. A second pair of coupling rods 24 is provided for the control of the circle segment-shaped elements 22b, and of said rods the one end is supported in a freely rotating manner on the shaft end of the pressing roller 2, whereas the other end is coupled with the circle segment-shaped element 22b by means of a pin 28.

When the pressing rollers 2 and 3 have to be heated or when the operation of the laminating device has to be interrupted temporarily, the frame, composed of the side plates 6, of the pressing roller 1 is turned clockwise about the pivot 8 by means of the screw spindle 21 (vide FIG. 3). By the coupling rods 23 the circle segment-shaped elements 22a also turn clockwise about the shaft ends of the pressing roller 2, and the film 4 is lifted from the pressing roller 2 by the bars 25. Simultaneously, by the pair of coupling rods 24, the circle segment-shaped elements 22b turn anti-clockwise about the shaft ends of the pressing roller 3, so that the film is lifted from the pressing roller 3 by the bars 25. Thus the pressing rollers can turn around free from the films 4, 5 during the time the pressing rollers are heated or during a period of time when the transport of the film has stopped, so that the rubber surface of the pressing rollers is not burnt locally by the heat irradiation of the infra-red radiators.

I claim:

1. An apparatus for laminating articles by applying a heat-activated first plastic foil to the top surface of said articles and a heat-activated second plastic foil to the bottom surface of said articles, comprising a first frame and a second frame and pivoting means for pivotably disposing said first frame with respect to said second frame, a first pressing roller rotatably supported on said first frame, a second pressing roller rotatably supported on said second frame, driving means for rotating said first and second pressing rollers, said pivoting means moving said first frame between a first position where said first pressing roller is pressed against said second pressing roller and a second position where said first pressing roller is spaced from said second pressing roller, said first and second plastic foils being supplied to said first and second pressing rollers at least where said first and second pressing rollers press against one another when in said first position, lifting means for lifting said first and second plastic foils away from said first and second pressing rollers, respectively, when in said second position to permit said first and second pressing rollers to rotate freely, and heating means for heating said first and second pressing rollers.

2. The apparatus as claimed in claim 1, further comprising screw spindle means coupling said first frame to said second frame for moving said first frame between said first and second positions.

3. The apparatus as claimed in claim 1, wherein said lifting means includes a first lifting element rotatably supported on said first pressing roller and a second lifting element rotatably supported on said second pressing roller, and coupling means for coupling said first and second lifting elements together such that when said first frame is in said first position, said first and second plastic foils pass over at least a portion of said first and second pressing rollers, respectively, and when said first frame is in said second position, said first and second lifting means lift said first and second plastic foils off of the surfaces of said first and second pressing rollers, respectively.

4. The apparatus as claimed in claim 3, wherein said first lifting element includes first and second shaped elements disposed respectively on opposite ends of said first pressing roller joined together by a plurality of first rods, said second lifting element including third and fourth shaped elements disposed respectively on opposite ends of said second pressing roller joined together by a plurality of second rods.

5. The apparatus as claimed in claim 4, wherein said first, second, third and fourth shaped elements are semi-circular and extend partially along the respective side edges of said first and second pressing rollers.

6. The apparatus as claimed in claim 4, wherein the distance from the center of the respective first and second pressing rollers to the center of the respective plurality of first and second rods is larger than the diameter of said first and second pressing rollers.

7. The apparatus as claimed in claim 4, wherein said coupling means includes first, second, third and fourth coupling bars, said first coupling bar having a first end rotatably coupled to said first shaped element and a second end rotatably coupled to said second frame, said second coupling bar having a first end rotatably coupled to said second shaped element and a second end rotatably coupled to said second frame, said first and second pressing rollers being rotatably disposed on first and second shafts, respectively, said third coupling bar having a first end rotatably coupled to said first shaft and a second end rotatably coupled to said third shaped element, said fourth coupling bar having a first end rotatably coupled to said first shaft and a second end rotatably coupled to said fourth shaped element.

8. The apparatus as claimed in claim 4, wherein said plurality of first and second rods face said pivoting means when said first frame is in said first position, said plurality of first and second rods facing one another when said first frame is in said second position to lift said first and second plastic foils off of said first and second pressing rollers, respectively.

9. The apparatus as claimed in claim 4, further comprising screw spindle means coupling said first frame to said second frame for moving said first frame between said first and second positions.

10. The apparatus as claimed in claim 1, wherein said driving means is disposed at the pivot point defined by said pivoting means.

11. The apparatus as claimed in claim 10, wherein said driving means includes a drive shaft disposed on said first frame having a first gear wheel and a first chain coupled intermediate said first pressing roller and said first gear wheel, and a second gear wheel disposed on said second frame in meshing engagement with said first gear wheel, and a second chain coupled intermediate said second pressing roller and said second gear wheel.

* * * * *